Sept. 13, 1932.  A. SILVENE  1,877,700

AIR BRAKE

Filed June 25, 1931  2 Sheets-Sheet 1

WITNESSES

INVENTOR
Anthony Silvene
BY

ATTORNEYS.

Sept. 13, 1932.     A. SILVENE     1,877,700
AIR BRAKE
Filed June 25, 1931     2 Sheets-Sheet 2
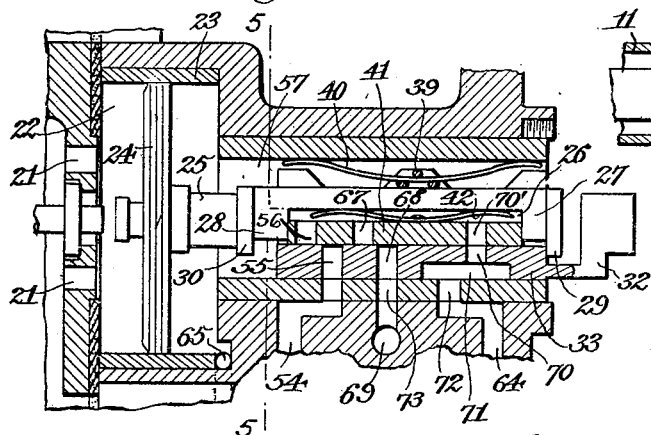
Fig. 3.
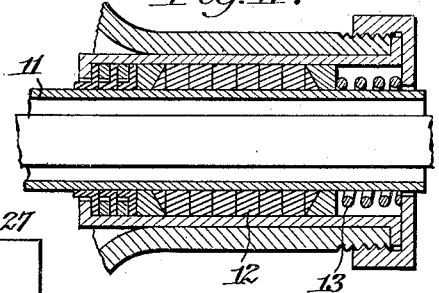
Fig. 11.
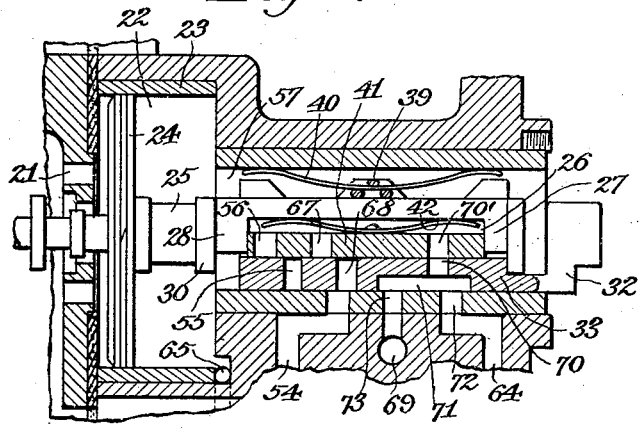
Fig. 4.
Fig. 5.
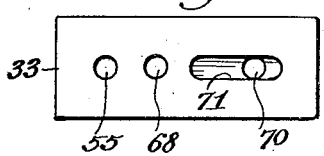
Fig. 6.
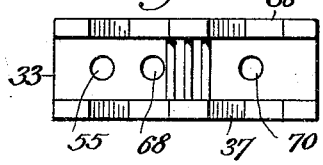
Fig. 7.
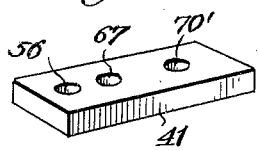
Fig. 10.
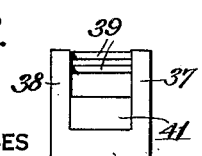
Fig. 8.
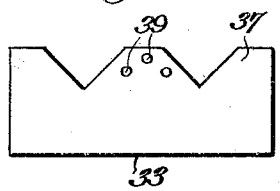
Fig. 9.
WITNESSES
Chris Feinle.
A. L. Kitchin
INVENTOR.
Anthony Silvene
BY
ATTORNEYS.

Patented Sept. 13, 1932

1,877,700

UNITED STATES PATENT OFFICE

ANTHONY SILVENE, OF VICTORIA, BRITISH COLUMBIA, CANADA

AIR BRAKE

Application filed June 25, 1931. Serial No. 546,888.

This invention relates to an air brake mechanism and has for an object to provide a construction including a control valve which places the operation of the air brake mechanism under complete control of the engineer.

Another object of the invention is to provide a valve under the control of the engineer which will permit pressure on the brake cylinder to be relieved whereby a quick and positive release of the brake will be secured.

Another object is to provide an improved air brake and associated mechanism wherein means are provided for charging both auxiliary and supplemental cylinders and to control the use of such charge.

This invention is an improvement over my prior Patent No. 1,514,995, issued November 11, 1924.

In the accompanying drawings—

Figure 3 is a sectional view through part of the control valve shown in Figure 2, the section being taken on the same line but the parts being in a second position.

Figure 4 is a view similar to Figure 3 but with the parts in a third position.

Figure 5 is a fragmentary sectional view through Figure 3 approximately on line 5—5.

Figure 6 is a bottom plan view of the lower slide valve shown in Figure 2.

Figure 7 is a top plan view of the valve shown in Figure 6.

Figure 8 is an end view of both the upper and lower slide valves shown in Figure 2.

Figure 9 is a side of the valve shown in Figure 7.

Figure 10 is a perspective view of the upper slide valve shown in Figure 2.

Figure 11 is a detail view of the piston rod packing gland.

Figure 1:
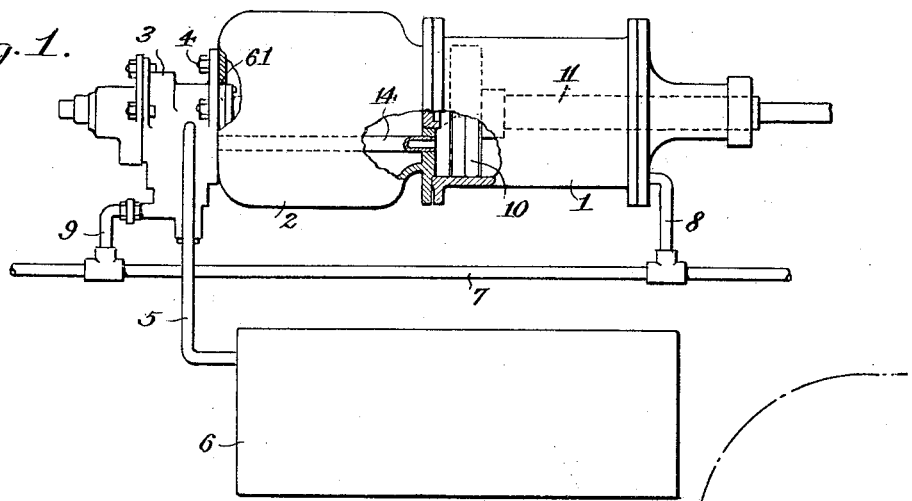
Figure 1 is a side view of an air brake mechanism disclosing an embodiment of the invention.

In constructing the air brake and air brake mechanism and system associated therewith, it is intended to follow the class of brakes and brake mechanisms wherein the pressure in the train line controls the action of the brakes. In the present instance, a control valve of a special structure has been provided which functions as the pressure in the train pipe increases and decreases so that when the pressure is high, the brakes will be completely released, but when the pressure is low, the brakes will be applied firmly and when the pressure is at some intermediate point, the brakes will be applied more or less according to the degree of pressure. In this way the engineer may vary at any time the action of the brakes by raising and lowering the pressure in the train pipe and by so doing may positively move the brake mechanism one way or the other, thus relieving to any appreciable extent any sticking of the brakes or any slow action of the brake mechanism.

Referring to the accompanying drawings by numerals, 1 indicates a brake cylinder, and 2 an auxiliary reservoir permanently connected thereto by bolts or similar means. A control valve 3 is connected by bolts 4 or other means to the auxiliary reservoir 2, and is in communication through the pipe 5 with the supplemental air reservoir 6. A train pipe 7 of the usual structure is connected to one end of the brake cylinder 1 by pipe 8 and is connected by pipe 9 to the control valve 3. It will be understood that the train pipe 7 is of the usual structure and extends for the full length of the car and when arranged in a train, is suitably connected so that the air pressure therein is under control of the engineer, who may raise or lower the pressure at will. The pipe 8 freely discharges at all times into the cylinder 1 in front of the piston 10 which piston may be of any desired structure and which is provided with a piston rod 11 extending through a packing gland 12 and thence to the brake rigging for applying a brake when actuated in one direction. The glands 12 may be of any desired kind, but preferably is a packing gland provided with a spring 13 whereby the packing will automatically take place and maintain a tight fit at all times, though permitting a movement of the piston rod 11. It will thus be seen that by reason of this structure whenever the air pressure in train pipe 7 is reduced, pressure entering cylinder 1 through the pipe 14 will act to move the piston 10 in a direction for applying brakes. Pipe 14 is connected to the auxiliary reservoir 2 through the control valve 3 and also, under some circumstances, is connected to the supplemental reservoir 6. When the mechanism of valve 3 is in one position, air from the reservoir 2 will pass through pipe 14 and move piston 10 a certain distance whereby the brakes will be applied rather lightly. If it is desired to apply the brakes fully, the control valve 3 is moved as hereinafter fully described a further distance and air from reservoir 6 will pass through pipe 14 and give the desired pressure to cause a full application of the brakes.

After the brakes have been applied and it is desired to release them, the engineer merely provides a supply of air under pressure to the pipe 7 so as to raise the pressure therein whereupon the pressure in the right hand end of the cylinder 1 through pipe 8 as shown in Figure 1 will begin to push the piston 10 in a direction for releasing the brakes. At the same time, air under the higher pressure will enter pipe 9 and will so affect valve 3 as to shut off both the supplemental reservoir 6 and the auxiliary reservoir 2, while at the same time exhausting pipe 14 to the atmosphere. In addition to this action, the valve mechanism in the valve 3 will be so adjusted that air from pipe 9 will enter the auxiliary reservoir 2 and also the supplemental reservoir 6, so that by the time the brakes have been completely released, the air in these two reservoirs will have been restored to a high pressure ready for a second application if desired.

Figure 2:
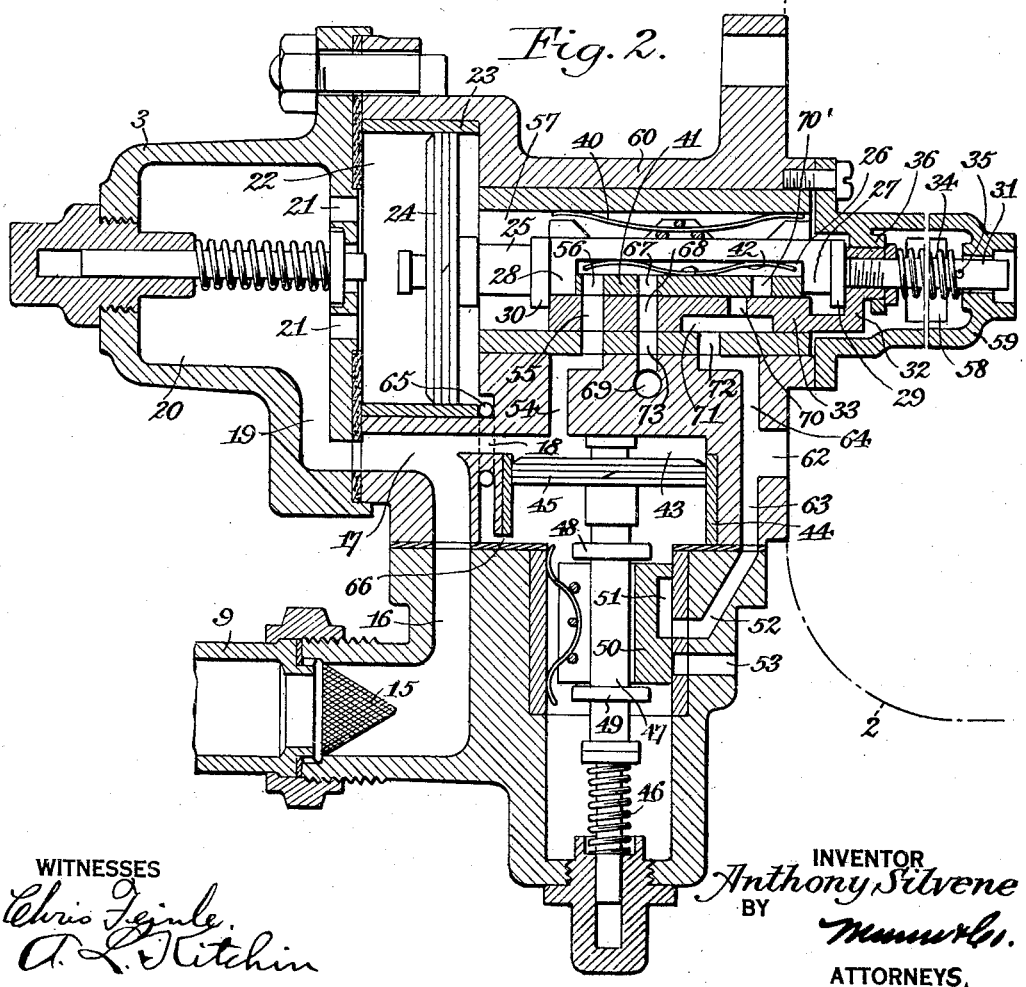
Figure 2 is a longitudinal vertical sectional view on an enlarged scale through the control valve shown in Figure 1.

In Figure 2, an enlarged sectional view through valve 3 is presented. From this figure it will be seen that the pipe 9 discharges the air through a suitable strainer 15 into the passageway 16. This passageway branches at 17 so that air will pass in one direction through the port or passageway 18 and in the opposite direction through port or passageway 19 into chamber 20. From chamber 20, air will pass through the openings 21 into the space 22 of cylinder 23. Air entering in this manner will force the piston 24 to the position shown in Figure 2, which position indicates that the brakes have been released.

A piston rod 25 is rigidly secured to piston 24 and is provided with a cut-out portion 26 whereby depending abutments 27 and 28 are presented. Enlargements 29 and 30 are also provided on the piston rod 25 and rigidly secured thereto in any desired manner. A rod 31 is connected to the extension 32 projecting from the lower slide valve 33. A spring 34 acts on the pin 35 and on the abutment 36 and tends to hold the slide valve continually in the position shown in Figure 2. This valve is provided with a pair of upstanding walls 37 and 38 (Figure 8), said walls carrying three rods 39 for accommodating the friction spring 40 which assists in preventing any chattering or loose motion to the valve 33. An upper valve 41 rests on top of the lower valve 33 and is held against chattering or loose motion by the friction spring 42 pressing against part of the piston rod 25 as shown in Figure 2.

When the parts are in the position shown in Figure 2, the brakes are released, but when the parts have been moved to the position shown in Figure 3, the brakes are lightly applied, and when the parts move to the position shown in Figure 4, the brakes are fully applied. When the parts are as shown in Figure 4, the main train pipe line 7 has been opened by the engineer and consequently the air pressure therein has been reduced greatly. When the engineer desires to release the brakes, he re-establishes the air pressure in pipe line 7 by shutting the relief valve in the engine and by turning on the pump or other supply of compressed air. As the pressure in line 7 raises, the air will pass through pipes 8 and 9. As the pressure increases in the brake cylinder 1 on the right hand side of the piston 10 as shown in Figure 1, the tendency will be to move the piston from the right hand end of the brake cylinder toward the position shown in Figure 1. While the pressure is being built up in the brake cylinder 1 as just described, the air under high pressure will be entering passageway 16 through pipe 9. Some of this air will pass through the port or passageway 19 into the chamber 20 and from thence into the space 22 of cylinder 23, thus acting to force the piston 24 to the right as shown in Figure 2. While the air pressure is being built up in the space 22, air is passing from the passageway 17 through passageway 18 into the space 43 of the cylinder 44. As the pressure is built up in the space 43, it will force the piston 45 downwardly as illustrated in Figure 2 against the action of spring 46 and as the piston moves downwardly, the piston rod 47 will naturally move the abutments 48 and 49 which are rigidly secured thereto so that the valve 50 will be shifted until the elongated port 51 connects passageway 52 with the exhaust port 53. As the air pressure is being built up in front of piston 45, namely, in space 43, some of the air will pass through the passageway 54 and through the port 55 in the lower valve 43 and also through the port 56 in the upper valve 41, so that air pressure will be built up in the chamber 57. This chamber is in free communication with the auxiliary reservoir 2 and consequently an air pressure will be built up in auxiliary chamber 2. The air passing from the chamber 57 will pass around the extension 32 and out through the opening 58 in the bracket 59 which carries certain parts as shown in Figure 2 and which is bolted directly to the casing 60 of the control valve 3. A bracket 59 is inserted bodily through the opening 61. The pipe 14 shown in Figure 1 is connected to the casing 60 in any desired manner with one end fitting into the opening 62 which opening is in free communication with the respective passageways 63 and 64. By reason of this construction and arrangement, when the valve 50 is moved to provide a communicating passageway between the passageway 52 and exhaust port 53, the air in pipe 14 and the left hand end of the cylinder 1 as shown in Figure 1 will be quickly exhausted whereupon the air pressure being built up through the passage of air in pipe 8 will cause the brakes to be quickly released. The air is exhausted from pipe 14 and associated parts almost immediately after the piston 45 has been forced downwardly and before an appreciable pressure has been built up in the auxiliary reservoir 2 and the chamber 57. Air passing from the port 56 in the upper valve 41 will naturally build up the pressure in chamber 57 and some of this air will pass into cylinder 23 back of the piston 24 and from thence to the passageway 65 and port 66 into cylinder 44 in back of piston 45 whereby in a short time the pressure on opposite sides of the piston 45 will be equalized. When this takes place, spring 46 will raise piston 45 and associated parts, including valve 50, to the position shown in Figure 2, while the piston 24 remains in the position shown in Figure 2. In this way, the pipe 14 is shut off or disconnected from the exhaust port 53 and consequently the air may be discharged through this pipe to brake cylinder 1 in front of the piston 10 for applying the brakes at any time. When the parts are as shown in Figure 2, the train pipe 7 is filled with air under high pressure and also cylinder 42 is filled at high pressure. In addition, some of the air from chamber 57 passes through port 67 to port 68 and from thence into a passageway 69 which passageway is connected with pipe 5. By reason of this structure, as air pressure is built up in the auxiliary reservoir 2 and in chamber 57, it will also be built up in the supplemental reservoir 6, thus providing an ample volume of air to quickly apply the brakes when necessary.

In case it should be desired to apply the brakes lightly, the engineer will open somewhat the control valve in the engine and consequently will reduce the pressure in pipe 7 somewhat. This reduction in pressure will cause the parts to move substantially to the position shown in Figure 3. When the parts are in this position, the air from the chamber 57 and auxiliary reservoir 2 is admitted in front of piston 10 whereby this piston is forced to the right as shown in Figure 1, and the brakes are lightly applied. The air pressure in these members is sufficient to overcome the reduced air pressure in pipe line 7. When the air pressure has been reduced in pipe line 7, the higher pressure in the chamber 57 will rather quickly move the piston 24 to the left until it assumes substantially the position shown in Figure 3. This movement is about half the full movement of the piston and results in the extensions 27 and 28 sliding the upper slide valve 41 so that the ports 56 and 57 will be out of registry with their corresponding ports in valve 33 but will cause the port 70′ to move into registry with port 70 which port is in free communication with the passageway 71 and this passageway is in free communication with port 72, which discharges into the passageway 64. Passageway 52 being closed, the air passing in the direction just described from chamber 57 and auxiliary reservoir 2 will pass through the opening 62 into the pipe 14 and from thence into the brake cylinder 1 in front of piston 10 whereby said piston is moved to apply the brakes lightly.

It will, therefore, be noted that upon an initial reduction in the train pipe pressure, namely, the pressure in pipe 7, the auxiliary reservoir will be equalized into the brake cylinder. Further reduction in pressure in pipe 7 will apply the brakes with a force proportional to the difference between the two mentioned pressures. When the pressure in pipe 7 has been reduced to some predetermined low degree the emergency stop will be overpowered and the pressure of the supplemental reservoir 6 will be added to the equalized pressure to increase the brake cylinder pressure, thus applying the brakes fully. To release the brakes, the engineer merely supplies the pipe 7 with air under high pressure and as the pressure increases in pipe 7, it will also increase in the brake cylinder 1, as it passes through the pipe 8 and increases in the space 22, as it passes from pipe 9 and certain other passageways into this space. The movement of piston 24 will cause the valves 33 and 42 to again assume the position shown in Figure 2 and the air acting on the piston 45 will quickly connect the pipe 14 with the exhaust port 53 so that the air in front of piston 10 will be quickly exhausted and consequently the brakes will be quickly released. After the brakes have been released, a new supply of air will be provided in auxiliary reservoir 2, chamber 57 and supplemental reservoir 6 ready for a second application of the brakes. It will thus be seen that the engineer at a distant point may apply and release the brakes freely by merely varying the air pressure in pipe 7. The control valve 3 quickly responds to either apply the brakes or to exhaust the air for releasing the brakes, and immediately upon exhausting of the air, sets the parts to build up quickly a new supply of air in the auxiliary reservoir 2 and supplemental reservoir 6.

I claim:

1. An air brake including a brake cylinder having a piston therein, a piston rod connected with said piston and extending from said cylinder, an auxiliary reservoir connected to one end of said brake cylinder but not in direct communication therewith, a vent pipe extending from one end of said brake cylinder through said auxiliary reservoir, a control valve carried by one end of said auxiliary reservoir, means for connecting the train pipe to one end of said brake cylinder and to said control valve whereby as the air in the train pipe rises and falls, a variation of pressure in the brake cylinder, auxiliary reservoir and control valve will take place, said control valve being formed to function upon each variation of air pressure, the parts being so proportioned and connected that when the air pressure has been raised to a high point in the auxiliary reservoir and in the control valve, parts of the control valve will be moved for connecting said vent pipe to an outlet.

2. An air brake including in combination, an air brake cylinder, a piston arranged in said cylinder, a piston rod connecting the piston and extending through one end of said cylinder, an auxiliary reservoir connected to said brake cylinder but not in direct communication therewith, a supply and vent pipe extending from one end of said brake cylinder through said auxiliary reservoir, a control valve carried by said auxiliary reservoir and connected to said supply and vent pipe, and means for connecting one end of said brake cylinder and said control valve to a source of air supply, said control valve including means which will function on variation of pressure supplied thereto whereby said brake cylinder may be vented at one time and at a second time may be under pressure for moving said piston and piston rod to a braking position.

3. In an air brake system for railways and the like, the combination of an air train pipe, a brake cylinder connected with said pipe at one end so as to receive air freely from said pipe, an auxiliary air reservoir, and a control valve connected with said pipe and said reservoir, said control valve including means for exhausting one side of said brake cylinder and for turning on air from said reservoir to the same side of the brake cylinder and means for applying air from said pipe to said reservoir.

4. In an air brake of the character described, a control valve including a casing, a pair of cylinder arranged in said casing, said cylinders extending at right angles to each other, a control piston arranged in one of said cylinders, a piston rod connected with said last mentioned piston, said piston rod having a plurality of pairs of abutments, a pair of slide valves arranged with a plurality of ports, one of said slide valves fitting snugly between two of said abutments and the other fitting loosely between the other two abutments whereby the movement of said piston in one direction will cause the movement of one of said slide valves, and a further movement in the same direction will cause a simultaneous movement of both of said slide valves, an auxiliary piston arranged in the other of said cylinders, an exhaust valve carried by said auxiliary piston, means forming a passageway for air to one face of said piston for forcing the piston in one direction whereby said exhaust valve will be moved to an exhausting position, a spring for moving said last mentioned valve and auxiliary piston back to their first position, and means for providing air passageways extending to the two first mentioned valves, said last mentioned means being arranged so that the passageways may act as inlet and outlet passageways.

5. An air brake for trains having train pipes carrying air under pressure, including a brake cylinder having one end connected with said train pipe for receiving air under pressure therefrom, an auxiliary reservoir, an inlet and exhaust pipe extending from said brake cylinder, the same communicating from the opposite end of the brake cylinder to hold the air from said train pipe entrance, the air from said train pipe acting to release the brakes and the air entering from the opposite end acting to apply the brake, a piston arranged in said brake cylinder adapted to move back and forth in the brake cylinder, a piston rod secured to said piston and extending through one end of said brake cylinder, a control valve connected with said train pipe and adapted to receive air under pressure therefrom, said control valve including a sliding valve and an air operated means for shifting the valve to connect the outlet from said brake cylinder to the air for exhausting from one end of the brake cylinder, said control valve also including a valve mechanism and air operated power means for actuating the valve mechanism for switching on air from said auxiliary reservoir to one end of said brake cylinder, said air switched on from the auxiliary reservoir acting to move said piston toward a braking position.

6. An air brake including a brake cylinder having an inlet at the forward end and a combined inlet and outlet at the rearward end, a piston arranged in said brake cylinder, a piston rod connected to said piston and extending through the forward end of said piston, means for directing air under pressure into the cylinder through the forward end thereof, a pipe connected to the rearward end of the brake cylinder exhausting and supplying air to the rearward end of the brake cylinder, an auxiliary reservoir, a control valve in communication with the means for supplying air under pressure to the forward end of said brake cylinder, said control valve being provided with a pair of valve mechanisms, one valve mechanism acting to connect the pipe leading from the rearward end of the brake cylinder to the air for exhausting the same and the other valve mechanism acting to connect said auxiliary reservoir to the last mentioned pipe for supplying air under pressure to the rearward end of the brake cylinder for urging said piston toward the forward end of the brake cylinder, said last mentioned valve mechanism functioning only when the air in said air supplying means has had the pressure thereof reduced.

7. An air brake including a brake cylinder provided with a piston and a piston rod, means for directing air into said brake cylinder at both ends, one of said means acting as an exhaust pipe, an auxiliary reservoir, and means for switching the communication of one end of said pipe to the air and to said auxiliary reservoir whereby one end of said brake cylinder may be connected with the air at one time and with said auxiliary reservoir at the other for applying or for releasing the brakes connected with said piston rod.

ANTHONY SILVENE.